W. H. SODEAU.
MEANS FOR INCREASING THE ENERGY OF STORED COMPRESSED AIR.
APPLICATION FILED JAN. 27, 1908.

964,574.

Patented July 19, 1910.

ATTEST.

INVENTOR.
WILLIAM H. SODEAU.
ATT'YS

UNITED STATES PATENT OFFICE.

WILLIAM HORACE SODEAU, OF NEWCASTLE-UPON-TYNE, ENGLAND, ASSIGNOR TO SIR W. G. ARMSTRONG WHITWORTH & COMPANY, LIMITED, OF NEWCASTLE-UPON-TYNE, ENGLAND.

MEANS FOR INCREASING THE ENERGY OF STORED COMPRESSED AIR.

964,574.

Specification of Letters Patent. Patented July 19, 1910.

Application filed January 27, 1908. Serial No. 412,921.

To all whom it may concern:

Be it known that I, WILLIAM HORACE SODEAU, a subject of the King of Great Britain and Ireland, residing at Elswick Works, Newcastle-upon-Tyne, in the county of Northumberland, England, have invented certain new and useful Improvements in Means for Feeding Liquids into Combustion-Chambers, of which the following is a specification.

This invention relates to apparatus such as is used in connection with plant using compressed air for operating a motor or the like. In such plant it is known to increase the energy of the compressed air by burning therein a liquid fuel.

The present invention has particular reference to the means used for feeding the fuel to the combustion chamber, and if so desired water or the like vaporizable liquid into the combustion products for the purpose of reducing the temperature of the same, and at the same time adding to the quantity of working fluid led to the engine.

The object of the present invention is to improve and simplify apparatus of this kind so as to give a simple and automatic adjustment of the fuel, water or like feed in accordance with the density of the air flowing through the combustion chamber or the like and proportional to the quantity or rate of flow of such air.

The present invention consists in means for increasing the energy of stored compressed air comprising means for feeding fuel, water or the like into the compressed air, said means being dependent on the kinetic energy of the air in the pipe leading from the reservoir to the engine.

The means used for feeding comprise a Pitot tube or the like set in the path of the air flowing to the engine—either a direct or reverse Pitot action may be employed as in either case the feeding action will be dependent on the kinetic energy of the air stream that is dependent on the square of the velocity of flow and on the density. Instead of or in addition to the Pitot tube an ordinary injector action may be employed.

Figure 6:
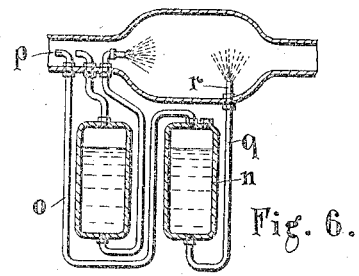
Figure 7:
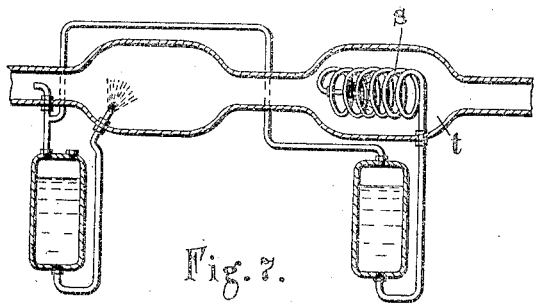

Referring now to the accompanying diagrammatic drawings which show convenient constructions of this invention such as may be applied to the air heating devices used in automobile torpedoes; Figures 1 to 5 illustrate diagrammatically means for feeding liquid fuel only into the combustion chamber; Figs. 6 and 7 show means for feeding both liquid fuel and water or the like into the air and combustion products respectively.

Figure 1:
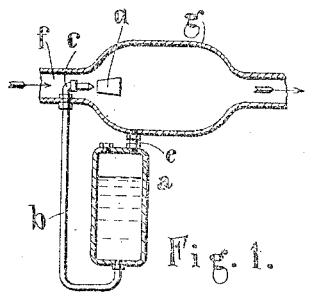

According to Fig. 1, liquid fuel from a tank, $a$, is led by a pipe, $b$, to a nozzle, $c$, within the air conduit pipe, $f$. The nozzle, $c$, points in the direction of flow of the air and into an open cone piece, $d$. A pipe, $e$, leads from the combustion chamber, $g$, which is conveniently an enlargement of the air conduit pipe to the upper end of the fuel tank, $a$. The air passing through the pipe, $f$, to the combustion chamber, $g$, exerts a suction or injection action on the fuel. This suction action is of course proportional to the kinetic energy of the moving stream.

Figure 2:
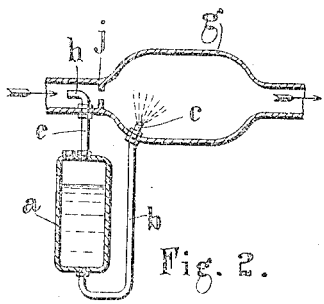

In Fig. 2 instead of employing an injector cone, $d$, a "Pitot" tube, $h$, is employed to set to face the stream of air passing into the combustion chamber, $g$. In this way, as is well known, a greater pressure than that in the pipe, $f$, is transmitted to the fuel tank, $a$, and the difference of the pressures in the pipe, $f$, and tank, $a$, in this form is dependent on the kinetic energy of the stream. In many cases it may be found desirable to place some resistance such as a perforated plate, $j$, in the pipe, $f$, between the Pitot tube, $h$, and the combustion chamber, $g$, as the "Pitot" pressure difference may not be sufficient to effect satisfactorily the feeding. This resistance may however be of any convenient form and in fact the pipe leading to the combustion chamber may be arranged to itself offer a sufficient resistance for the purpose required. The fuel in the form shown in Fig. 3 is led to a spraying nozzle in the combustion chamber.

Figure 3:
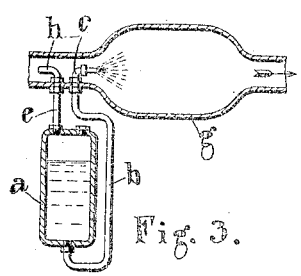

In Fig. 3 the Pitot tube action is employed for collecting the air pressure on the liquid fuel while a reverse Pitot tube is employed for spraying. In this way the Pitot action is increased and in some cases no additional resistance may be required.

Figure 4:
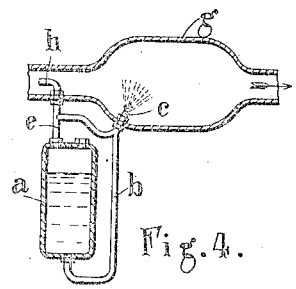

In Fig. 4 a Pitot tube is employed for collecting the pressure on the top of the liquid fuel and also for collecting air of slightly higher pressure than that in the combustion chamber for the purpose of spraying fuel which is led from the oil tank, $a$, to the nozzle, $c$.

Figure 5:
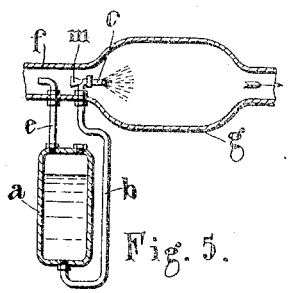

In Fig. 5 instead of taking the spraying air from the Pitot tube, there is provided a cone, $m$, which collects the air and helps the oil to spray from the nozzle, $c$.

In Fig. 6 the form of fuel feed illustrated in Fig. 3 is employed and in addition to the fuel tank there is provided a reservoir, $n$, for water, a solution of ammonia, salts or the like. The tank, $n$, is connected by a pipe, $o$, to a Pitot tube, $p$, and by a pipe, $q$, to a nozzle, $r$, in the combustion chamber, whereby water or the like is sprayed into the products of combustion which not only has the effect of cooling these down to a workable point but also adds to the volume of working fluid passed to the engine. In torpedoes where space is somewhat limited this is a point of considerable importance.

In Fig. 7 instead of leading the water or the like from the tank, $n$, directly into the combustion products it is first led through a spiral, $s$, placed conveniently in an enlarged portion, $t$, of the pipe leading from the combustion chamber to the engine. The water or the like is heated while passing through the spiral and is discharged into the combustion products as indicated at $t$, in the form of a vapor or hot liquid.

The feeding of water or the like may of course be aided by means of a resistance in the path of the main air stream as in the case of feeding fuel.

It will be evident that there are many equivalent ways of directly using the kinetic energy of the stream flowing to the engine to feed the liquid fuel water or the like into the air or combustion products.

Having now described my invention, what I claim as new and desire to secure by Letters Patent is:—

1. Means for increasing the energy of stored compressed air comprising in combination a combustion chamber, a conduit leading compressed air to said combustion chamber, a receptacle for liquid, means leading from said receptacle to said combustion chamber and means connecting said receptacle with the compressed air conduit, said means having an opening in the conduit facing toward the oncoming air whereby the kinetic energy of the air stream in the conduit produces a pressure in the liquid receptacle in excess of that in the air conduit and combustion chamber.

2. Means for increasing the energy of stored compressed air, comprising in combination a combustion chamber, a receptacle for liquid fuel, a jet in said combustion chamber, a pipe leading from said receptacle to said jet, a Pitot tube placed in a passage in which a current of air is flowing, and a pipe leading from said receptacle to said Pitot tube, as and for the purpose described.

3. Means for increasing the energy of stored compressed air comprising in combination a combustion chamber, a passage through which air or gases are flowing, a water receptacle, a pipe connecting between the bottom of said water receptacle and the end of said chamber remote from said air passage, a Pitot tube in said passage and a connection from said Pitot tube to said water receptacle, as and for the purposes described.

4. Means for increasing the energy of stored compressed air comprising in combination a combustion chamber, a conduit leading compressed air to said combustion chamber, a fuel receptacle, means leading from said receptacle to said combustion chamber, and means connecting said receptacle with the compressed air conduit, said means having an opening in the conduit facing toward the oncoming air whereby the kinetic energy of the air stream in the conduit produces a pressure in the fuel receptacle in excess of that in the air conduit and combustion chamber, and a water receptacle, means leading from said water container to the combustion chamber, and means connecting said water container with the compressed air conduit, said means having an opening in the conduit facing toward the oncoming air whereby the kinetic energy of the air stream in the conduit produces a pressure in the water container in excess of that in the air conduit and combustion chamber.

5. Means for increasing the energy of stored compressed air comprising a combustion chamber, a liquid reservoir, a conduit leading air to said combustion chamber and means acting to utilize the kinetic energy of the air stream entering the combustion chamber to produce a greater pressure in said receptacle than exists in said air conduit and means for delivering liquid from the receptacle into the combustion chamber.

6. Means for increasing the energy of stored compressed air, comprising in combination a combustion chamber, a fuel receptacle, a water receptacle, connections from said fuel and water receptacles respectively to said chamber, a passage through which air or gases are flowing, Pitot tubes in said passage, and connections between said Pitot tube and said receptacles.

In testimony whereof, I affix my signature in presence of two witnesses.

WILLIAM HORACE SODEAU.

Witnesses:
STEPHEN MAGUIRE MURRAY,
ROBERT WALLS THOWBURN.